United States Patent

[11] 3,548,073

[72] Inventors Tsutomu Nishino
Yokohama;
Haruo Maeda, Tokyo, Japan
[21] Appl. No. 791,099
[22] Filed Jan. 14, 1969
[45] Patented Dec. 15, 1970
[73] Assignee Matsushita Electric Industrial Co., Ltd.
Osaka, Japan
a corporation of Japan
[32] Priority Jan. 20, 1968
[33] Japan
[31] No. 3399/68

[54] ULTRA BROAD-BAND DELAY LINE
2 Claims, 3 Drawing Figs.

[52] U.S. Cl. .......... 174/15, 174/102; 333/99
[51] Int. Cl. .......... H01u 11/12
[50] Field of Search .......... 174/(SC); 1/15, 102; 333/995; 335/216

[56] References Cited
UNITED STATES PATENTS

| | | | |
|---|---|---|---|
| 3,263,193 | 7/1966 | Allen | 174/102X |
| 3,309,453 | 3/1967 | Emory | 174/(SC) |
| 3,366,728 | 1/1968 | Garwin | 174/(SC) |

*Primary Examiner*—E. A. Goldberg
*Attorney*—Stevens, Davis, Miller & Mosher

ABSTRACT: An ultra broadband delay line having an inner conductor made from a superconducting metal and an outer conductor made from a metal which does not go into a superconducting state. The delay line having such a structure is free from any variation in transmission characteristics.

INVENTORS
TSUTOMO NISHINO
HARUO MAEDA
BY Stevens, Davis, Miller & Mosher
ATTORNEYS

PATENTED DEC 15 1970

3,548,073

SHEET 2 OF 2

INVENTORS

TSUTOMO NISHINO

HARUO MAEDA

BY Stevens, Davis, Miller & Mosher

ATTORNEYS

ULTRA BROAD-BAND DELAY LINE

This invention relates to ultra broadband delay lines and more particularly to a helium-cooled, ultra broadband, coaxial delay line which is developed for the purpose of uniformly delaying a signal over a wide frequency range of from DC to 1,000 megahertz and up to 5,000 megahertz.

Conventional ultra broadband delay lines include a superconducting delay line in which both the inner core conductor and the outer conductor are placed in their superconducting state by being held at the temperature of liquid helium so as to eliminate the objectionable transmission loss and to give the line the desired ultra broadband transmission characteristics. Such a superconducting delay line in which the resistance becomes substantially zero as a matter of fact is defective in that resonance appears in the line resulting in a periodic variation of the transmission characteristics of the line.

A conventional low-loss cable can not satisfactorily be used as a delay cable showing uniform transmission characteristics over a wide frequency range of from DC to 5 gigahertz in view of an abrupt increase in its transmission loss in a high frequency region due to the skin effect and in view of the cutoff characteristics appearing as a result of conversion in the $H_10$ transmission mode. In order to overcome such a difficulty, a helium-cooled superconducting delay line has been developed which comprises an inner conductor and an outer conductor formed from a superconducting metal. However, such a superconducting delay cable is unfit for practical use since a conspicuous resonance mode as shown in FIG. 2 appears in its transmission characteristics. The undesirable resonance mode results from the fact that discontinuity in impedance exists at the connection points between the cable in the superconducting state and signal lead-in and lead-out cables which are kept at room temperature. A resonance mode showing a high Q value occurs within the superconducting cable whose resistance is theoretically zero in the area defined between these nodal points. Therefore, as shown in the transmission characteristics in FIG. 2, an abrupt periodic signal absorption, i.e., signal energy storage, takes place in the superconductive cable at frequency intervals of $\Delta f=\frac{u}{2L}$, where L is the total length of the superconducting cable and $u$ is the propagation velocity in the superconducting cable. The superconducting cable of the kind described above is thus quite unfit for practical use.

It is therefore an object of the present invention to provide a helium-cooled delay cable which is free from the occurrence of objectionable resonance as described above.

In accordance with the present invention, there is provided an ultra broadband delay cable in which the outer conductor having a large surface area is formed from a metal such as copper which does not go into a superconducting state and the inner core conductor is formed from a superconducting metal such as niobium.

The above and other objects, features and advantages of the present invention will be apparent from the following description of a preferred embodiment thereof when taken in conjunction with the accompanying drawings, in which.

Figures 1, 2:
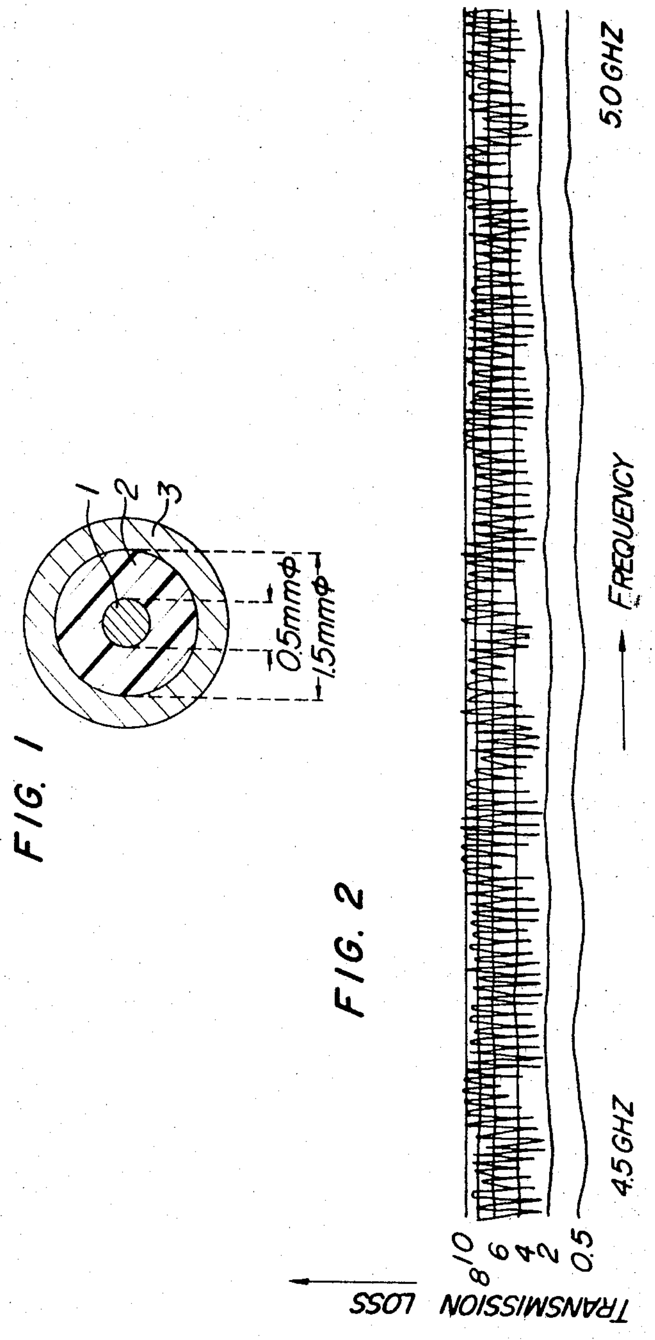
FIG. 1 is a cross-sectional view showing the structure of the coaxial, narrow diameter, helium-cooled delay cable embodying the present invention.
FIG. 2 is a diagrammatic illustration of the transmission characteristics of a conventional superconducting delay cable in which the inner core conductor and the outer conductor are formed from niobium and lead, respectively.

Referring to FIG. 1, the helium-cooled delay cable of the present invention comprises an inner conductor 1 of niobium, an intermediate layer 2 of Teflon, and an outer conductor 3 of copper.

Figure 3:
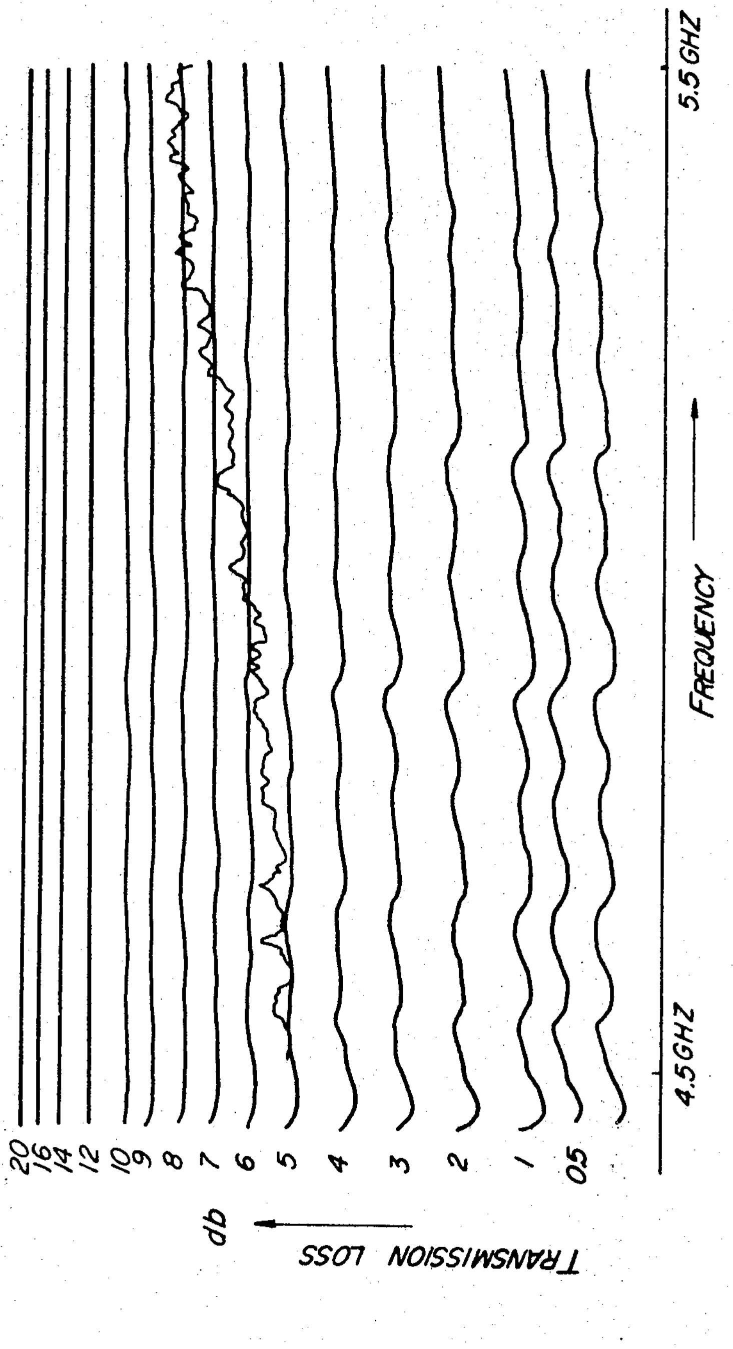
FIG. 3 is a diagrammatic illustration of the transmission characteristics of the delay line according to the present invention.

In the helium-cooled delay cable of the present invention comprising the combination of different metal materials, the inner core conductor 1 goes solely into a superconducting state while the outer coaxial conductor 3 does not go into a superconducting state. By virtue of such a structure, the Q value of the cable immersed in and cooled by liquid helium is prevented from becoming excessively high. Therefore, the delay line has uniform transmission characteristics over a wide frequency range of from DC to 5 gigahertz as seen in FIG. 3. The delay line according to the present invention is thus free from the objectionable performance encountered with prior art delay lines.

We claim:

1. An ultra broadband coaxial delay line comprising an inner conductor formed of a superconductive metal, an outer metal conductor insulated from said inner conductor with an intermediate layer formed of a fluorinated dielectric, and means maintaining said delay line at cryogenic temperatures at which said superconductive metal is in its superconducting state, said outer conductor having a large surface area and being formed of a material of low resistivity having no superconductive properties at any temperature.

2. An ultra broadband coaxial delay line according to claim 1, in which the material of said outer conductor is copper and the inner conductor is niobium.